United States Patent
Porat et al.

(10) Patent No.: US 8,095,769 B2
(45) Date of Patent: Jan. 10, 2012

(54) METHOD FOR ADDRESS COMPARISON AND A DEVICE HAVING ADDRESS COMPARISON CAPABILITIES

(75) Inventors: Rotem Porat, Kfar Saba (IL); Moshe Anschel, Kfar Saba (IL); Itay Peled, Hod Hasharon (IL); Erez Steinberg, Tel-Aviv (IL); Ziv Zamsky, Raanana (IL)

(73) Assignee: Freescale Semiconductor, Inc., Austin, TX (US)

( * ) Notice: Subject to any disclaimer, the term of this patent is extended or adjusted under 35 U.S.C. 154(b) by 802 days.

(21) Appl. No.: 12/194,273

(22) Filed: Aug. 19, 2008

(65) Prior Publication Data

US 2010/0049939 A1    Feb. 25, 2010

(51) Int. Cl.
*G06F 12/00* (2006.01)
*G06F 13/00* (2006.01)
*G06F 13/28* (2006.01)
*G06F 9/26* (2006.01)
*G06F 9/34* (2006.01)

(52) U.S. Cl. ........ 711/201; 711/200; 711/202; 711/220; 711/100

(58) Field of Classification Search ........................ None
See application file for complete search history.

(56) References Cited

U.S. PATENT DOCUMENTS

| | | | |
|---|---|---|---|
| 5,611,064 | A | 3/1997 | Maund et al. |
| 5,638,516 | A | 6/1997 | Duzett et al. |
| 6,453,367 | B2 | 9/2002 | Barry |
| 6,735,728 | B1 | 5/2004 | Tiedemann et al. |
| 6,985,983 | B2 | 1/2006 | Pellegrino et al. |
| 7,110,408 | B1 | 9/2006 | Nataraj |
| 2007/0143551 | A1 | 6/2007 | Marr et al. |
| 2007/0198806 | A1 | 8/2007 | Schultz |
| 2007/0277009 | A1 | 11/2007 | Anschel et al. |

*Primary Examiner* — Sanjiv Shah
*Assistant Examiner* — Marwan Ayash

(57) ABSTRACT

A method for address comparison, the method includes: (i) receiving an input address; (ii) determining whether the input address is within a memory segment out of a group of memory segments by comparing, in parallel, the input address to memory segment boundaries of each memory segment of the group; (iii) wherein a comparison between the input address and a memory segment boundary comprises: (a) applying a XOR operation on bits of a most significant portion of the input address and corresponding bits of a most significant portion of the memory segment boundary; (b) ignoring bits of a least significant portion of the input address and corresponding bits of a least significant portion of the memory segment boundary; and (c) comparing, by utilizing a set of full comparators, between bits of an intermediate portion of the input address and corresponding bits of an intermediate portion of the memory segment boundary; wherein a location of bits that form the intermediate portion of the input address and of the memory segment boundary is selected in response to an alignment restriction imposed on the memory segment, to a size of the memory segment and in response to a boundary restriction imposed on the memory segment.

19 Claims, 4 Drawing Sheets

300

METHOD FOR ADDRESS COMPARISON AND A DEVICE HAVING ADDRESS COMPARISON CAPABILITIES

FIELD OF THE INVENTION

The present invention relates to a method for address comparison and to a device that has address comparison capabilities.

BACKGROUND OF THE INVENTION

Address comparison can be used for various purposes including but not limited to memory protection, virtual to physical memory address translation, and the like. Typically, a large memory space can include multiple memory segments that are deemed to be relevant as well as irrelevant memory segments. Various limitations (such as boundary restrictions, size restrictions, and alignment restrictions) can be imposed on the location of the memory segments An address comparison process can include determining, in parallel, whether an input address is included in either one of a group of relevant memory segments. This parallelism can require multiple comparison modules that speed up the address comparison process but consume expensive semiconductor area and power.

The complexity of the address comparison process and especially the resources allocated for this process is inversely proportional to the restrictions that are imposed on the locations of the memory segments. In order to relax the limitations imposed on the locations of the memory segments there is a need to use a full comparator per each bit (or almost each bit) of the input address. A full comparator is able to determine whether compared elements are equal to each other and if not which compared element is bigger than the other. A full comparator is also referred as a "<,> comparator" or "smaller than, equal to or greater than" comparator. A full comparator is expensive and consumes semiconductor area and power.

SUMMARY OF THE PRESENT INVENTION

The present invention provides a method and a system as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings.

DETAILED DESCRIPTION OF THE DRAWINGS

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

It has been found that an optimal tradeoff between the amount of full comparators and memory segment limitations can be achieved by utilizing full comparators for comparing bits of an intermediate portion of an input address (and corresponding bits of memory segment boundaries), allocating XOR logic gates for applying a XOR operation on bits of a most significant portion of the input address (and corresponding bits of memory segment boundaries). The selection (or determination) of which bits form the intermediate operation is responsive to various memory segment parameters such as memory segment size, memory segment alignment restriction and the like.

The intermediate portion of the input address (the number of bits that belong to the intermediate portion) can be smaller than one half or even one third of the input address. The intermediate portion of the input address can be smaller than the most significant portion of the input address.

Figure 1:
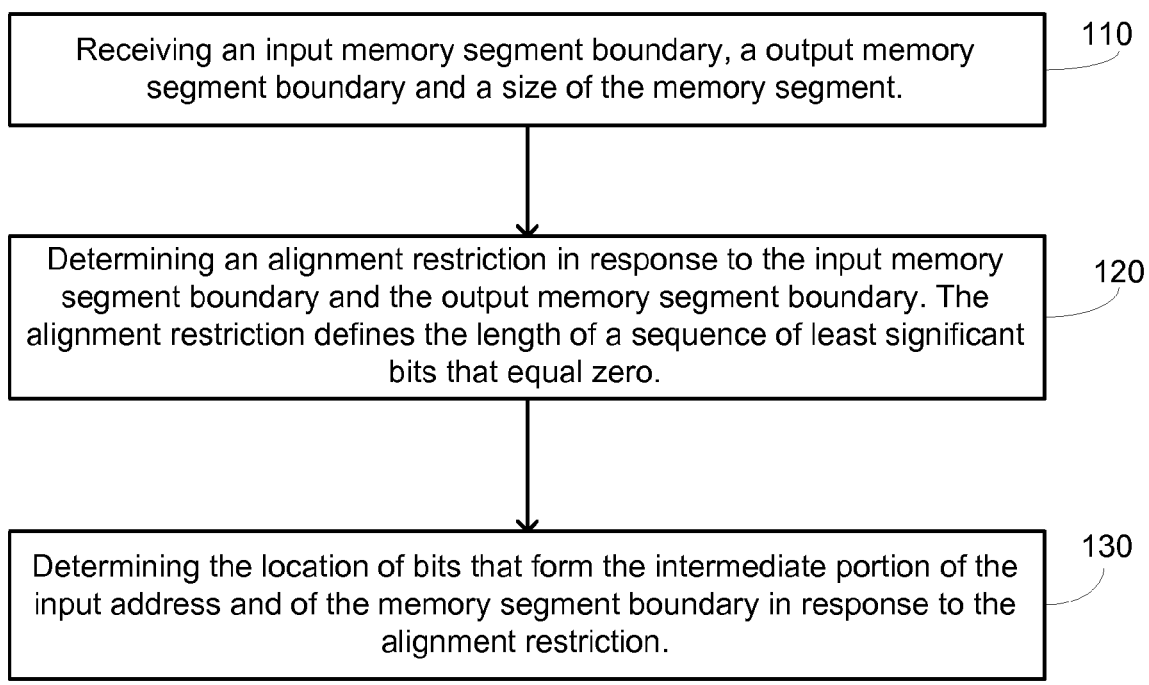
FIG. 1 schematically shows an example of an embodiment of a method.

FIG. 1 schematically shows an example of an embodiment of method 100.

Method 100 starts by stage 110 of receiving an input (pre-translation) memory segment boundary, an output (after translation) memory segment boundary and a size of the memory segment. The input memory segment can be a virtual memory segment and the output memory segment can be a physical memory segment. A memory segment boundary can be a start address of the memory segment or the end address of the memory segment.

Stage 110 can also include receiving only the input memory segment boundary and the size of the memory segment.

Stage 110 is followed by stage 120 of determining an alignment restriction in response to the input memory segment boundary and the output memory segment boundary. The alignment restriction reflects the length of a sequence of least significant bits that equal zero.

Stage 120 can include determining the alignment restriction in response to a location of the first non-zero bit of the input memory segment boundary and in response to a location of the first non-zero bit of the output memory segment boundary. For example, if the first non-zero bit of the output memory segment boundary is the ninth bit (corresponding to 256 bytes) and the first non-zero bit of the input memory segment boundary is the eleventh bit (corresponding to 1 K bytes) then the alignment restrictions should comply with the ninth bit (corresponding to 256 bytes). Thus, the memory segment should start at an address that is an integer multiple of 256 bytes. Assuming that the alignment restriction is 256 bytes and there are J full comparators then the memory segment should not include (should not cross) an integer multiple of ($2^{J}$*256 bytes). If for example, there are eight full comparators and the alignment restriction is 256 bytes then the memory segment should not include an integer multiple of 64 Kilo Bytes.

Stage 120 is followed by stage 130 of determining the location of bits that form the intermediate portion of the input address and of the memory segment boundary in response to the alignment restriction.

An example of an embodiment of stage 130 will be further illustrated by table 1 and the following example. Table 1 illustrates a sample of allowed relationships between memory segment size, boundary restrictions and alignment restrictions, assuming that eight bits are compares by full comparators. It is noted that other relationships can be defined and that fewer or more than four cases can be implemented.

TABLE 1

| Case # | Segment size | Boundary restriction | Alignment restriction |
|---|---|---|---|
| A | 256 Bytes till 32 Kilo Bytes | 64 Kilo Bytes | 256 Bytes |
| B | 1 Kilo Bytes till 128 Kilo Bytes | 256 Kilo Bytes | 1 Kilo Byte |
| C | 16 Kilo Bytes till 2 Mega Bytes | 4 Mega Bytes | 16 Kilo Bytes |
| D | 64 Kilo Bytes till 8 Mega Bytes | 16 Mega Bytes | 64 Kilo Bytes |

Assuming, for example, that the memory segment size is 32 Kilo bytes and assuming that the alignment restriction is 16 Kilo Bytes. Cases A, B and C can be applied for such a memory segment size. Because the alignment restriction is 16 Kilo Bytes then either one of cases A, B and C can be applied. In this scenario case C can be selected—thus allowing a user (or a segment boundary determination unit) to select any memory segment that does not include an integer multiple of 4 Mega Bytes.

Yet for another example, assuming that the memory segment size is 128 Kilo bytes (cases B, C and D can be applied) and assuming that the alignment restriction is 16 Kilo Bytes (cases A,B, and C can be applied). In this scenario case C can be selected—thus allowing a user (or a segment boundary determination unit) to select any memory segment that does not include an integer multiple of 4 Mega Bytes.

It is noted that multiple allowed relationships can be defined and that a request to allocate a memory segment that does not comply with any of the allowed relationship can trigger an alert, set a flag, generate a user indication and the like.

In this case the intermediate portion of each of the input address and the (input and output) memory segment boundary will start by the $15^{th}$ bit and will end at the $(15+J-1)^{th}$ bit. For example, if J=8 then the intermediate portion includes the $15^{th}$ till the $22^{nd}$ bits, the most significant portion will starts at the $23^{rd}$ bit and the fourteen least significant bits are ignored of.

Figure 2:
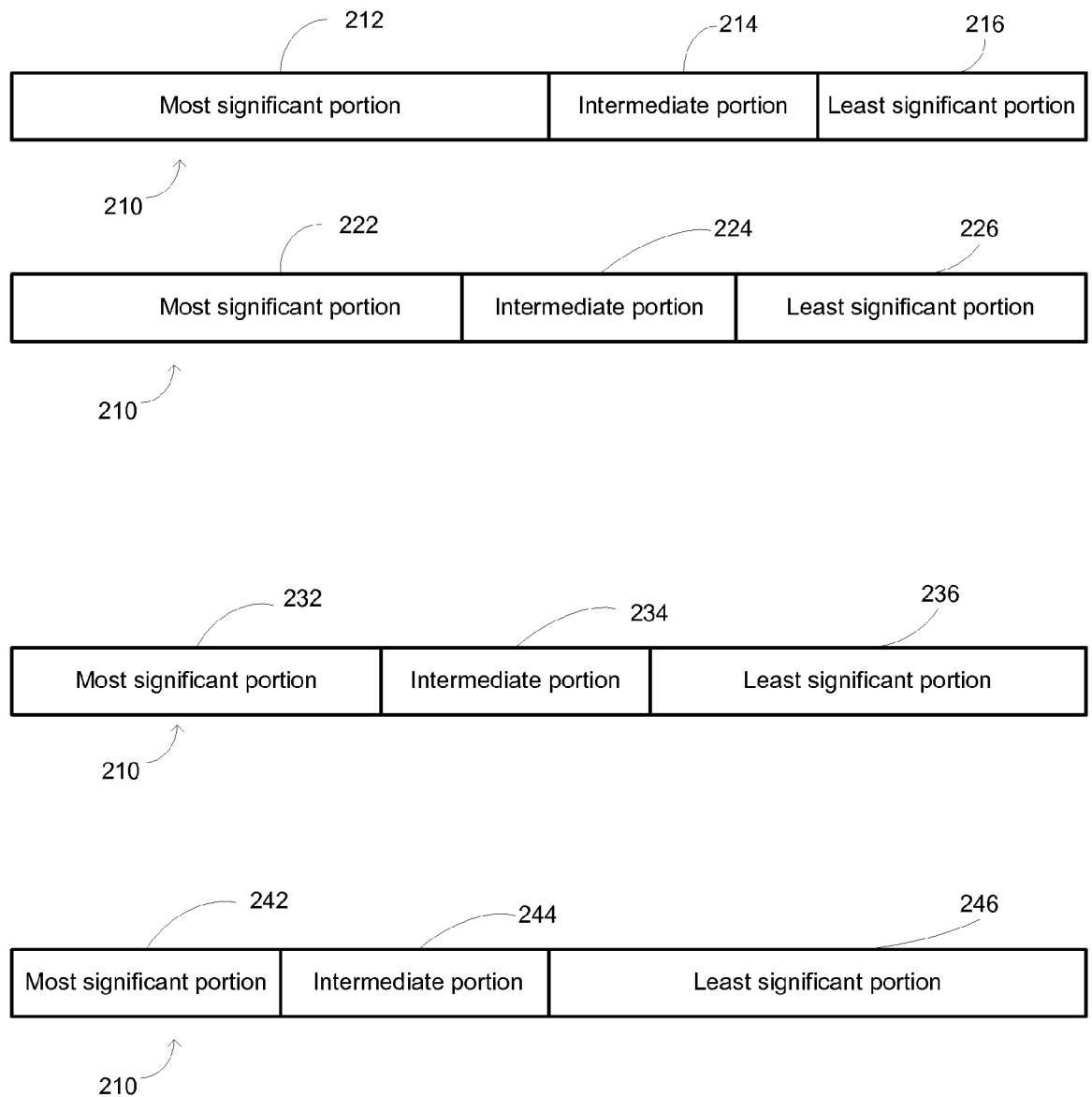
FIG. 2 schematically shows an example of an embodiment of an input address.

FIG. 2 illustrates various portions of an input address that comply with the four cases of table 1. It is assumed that the input address is 32 bits long.

If case A is selected then most significant portion 212 of input address 210 includes the $17^{th}$ till the $32^{nd}$ bits of input address 210, intermediate portion 214 of input address 210 includes the $9^{th}$ till the $16^{th}$ bits of input address 210 and least significant portion 216 of input address 210 includes the first till the $8^{th}$ bits of input address 210. Input address 210 can have the following format: "mmmm mmmm mmmm mmmm iiii iiii llll llll", wherein "m" represents a bit of most significant portion 212, "i" represents a bit of intermediate portion 214 and "l" represents a bit of least significant portion 216.

If case B is selected then most significant portion 222 of input address 210 includes the $19^{th}$ till the $32^{nd}$ bits of input address 210, intermediate portion 224 of input address 210 includes the $11^{th}$ till the $18^{th}$ bits of input address 210 and least significant portion 226 of input address 210 includes the first till the $10^{th}$ bits of input address 210. Input address 210 can have the following format: "mmmm mmmm mmmm mmii iiii iill llll llll", wherein "m" represents a bit of most significant portion 222, "i" represents a bit of intermediate portion 224 and "l" represents a bit of least significant portion 226.

If case C is selected then most significant portion 232 of input address 210 includes the $23^{rd}$ till the $32^{nd}$ bits of input address 210, intermediate portion 234 of input address 210 includes the $15^{th}$ till the $22^{nd}$ bits of input address 210 and least significant portion 236 of input address 210 includes the first till the $14^{th}$ bits of input address 210. Input address 210 can have the following format: "mmmm mmmm mmii iiii iill llll llll llll", wherein "m" represents a bit of most significant portion 232, "i" represents a bit of intermediate portion 234 and "l" represents a bit of least significant portion 236.

If case D is selected then most significant portion 242 of input address 210 includes the $25^{th}$ till the $32^{nd}$ bits of input address 210, intermediate portion 244 of input address 210 includes the $17^{th}$ till the $24^{th}$ bits of input address 210 and least significant portion 246 of input address 210 includes the first till the $16^{th}$ bits of input address 210. Input address 210 can have the following format: "mmmm mmmm iiii iiii llll llll llll llll", wherein "m" represents a bit of most significant portion 232, "i" represents a bit of intermediate portion 234 and "l" represents a bit of least significant portion 236.

In any of the mentioned above cases, the least significant portion (216, 226, 236 and 246) is ignored of, bits of the intermediate portion (214, 224, 234 and 244) are sent (for comparison) to full comparators and bits of the most significant portion (212, 222, 232 and 242) are sent to XOR gates.

These multiple cases allow a user (or a segment boundary determination unit) to select memory segments in a relatively flexible manner.

Figure 3:
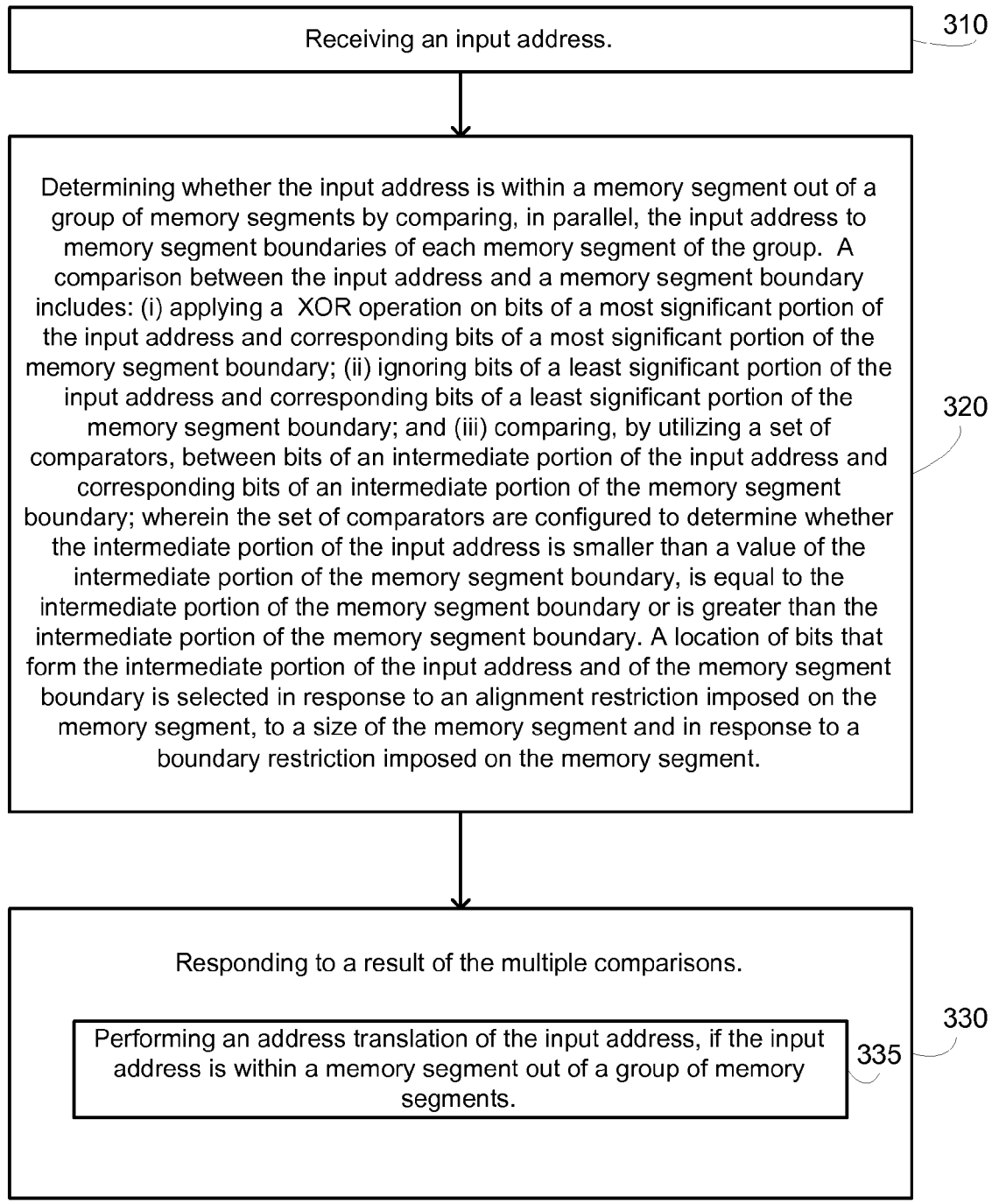
FIG. 3 schematically shows an example of an embodiment of a method.

FIG. 3 schematically shows an example of an embodiment of method 300.

Method 300 can be preceded by method 100. While method 100 can be used to configure multiple address comparison modules, method 300 can be executed whenever an input address is received. The configuration includes Method 300 starts by stage 310 of receiving an input address.

Stage 310 is followed by stage 320 of determining whether the input address is within a memory segment out of a group of memory segments by comparing, in parallel, the input address to memory segment boundaries of each memory segment of the group. Memory segment boundaries include a memory segment start address and a memory segment end address. A comparison between the input address and a memory segment start boundary includes: (i) applying a XOR operation on bits of a most significant portion of the input address and corresponding bits of a most significant portion of the memory segment boundary; (ii) ignoring bits of a least significant portion of the input address and corresponding bits of a least significant portion of the memory segment boundary; and (iii) comparing, by utilizing a set of comparators, between bits of an intermediate portion of the input address and corresponding bits of an intermediate portion of the memory segment boundary; wherein the set of comparators are configured to determine whether the intermediate portion of the input address is smaller than the intermediate portion of the memory segment boundary, is equal to the intermediate portion of the memory segment boundary or is greater than the intermediate portion of the memory segment boundary. A location of bits that form the intermediate portion of the input address and of the memory segment boundary is selected in response to an alignment restriction imposed on the memory segment, to a size of the memory segment and in response to a boundary restriction imposed on the memory segment.

The location can be determined by applying method 100 but this is not necessarily so. Once the location is determined stage 320 can include selecting which bits of the input address to send to XOR logical gates, selecting which bits of the input address to send to a set of comparators and which bits of the input address to ignore.

Stage 320 can be followed by stage 330 of responding to a result of the multiple comparisons.

Stage 330 can include, for example, stage 335 of performing an address translation of the input address, if the input address is within a memory segment out of a group of memory segments.

Stage 335 can include: (i) replacing bits of the most significant portion of the input address by corresponding bits of a most significant portion of an output memory segment base address; (ii) copying the bits of the least significant portion of the input address; and (iii) adding to the intermediate portion of the input address a difference between an output memory segment base address and an input memory segment base address.

The address translation can include translating a virtual address to a physical address but this is not necessarily so. The address translation can differ from a virtual to physical memory address translation.

Figure 4:
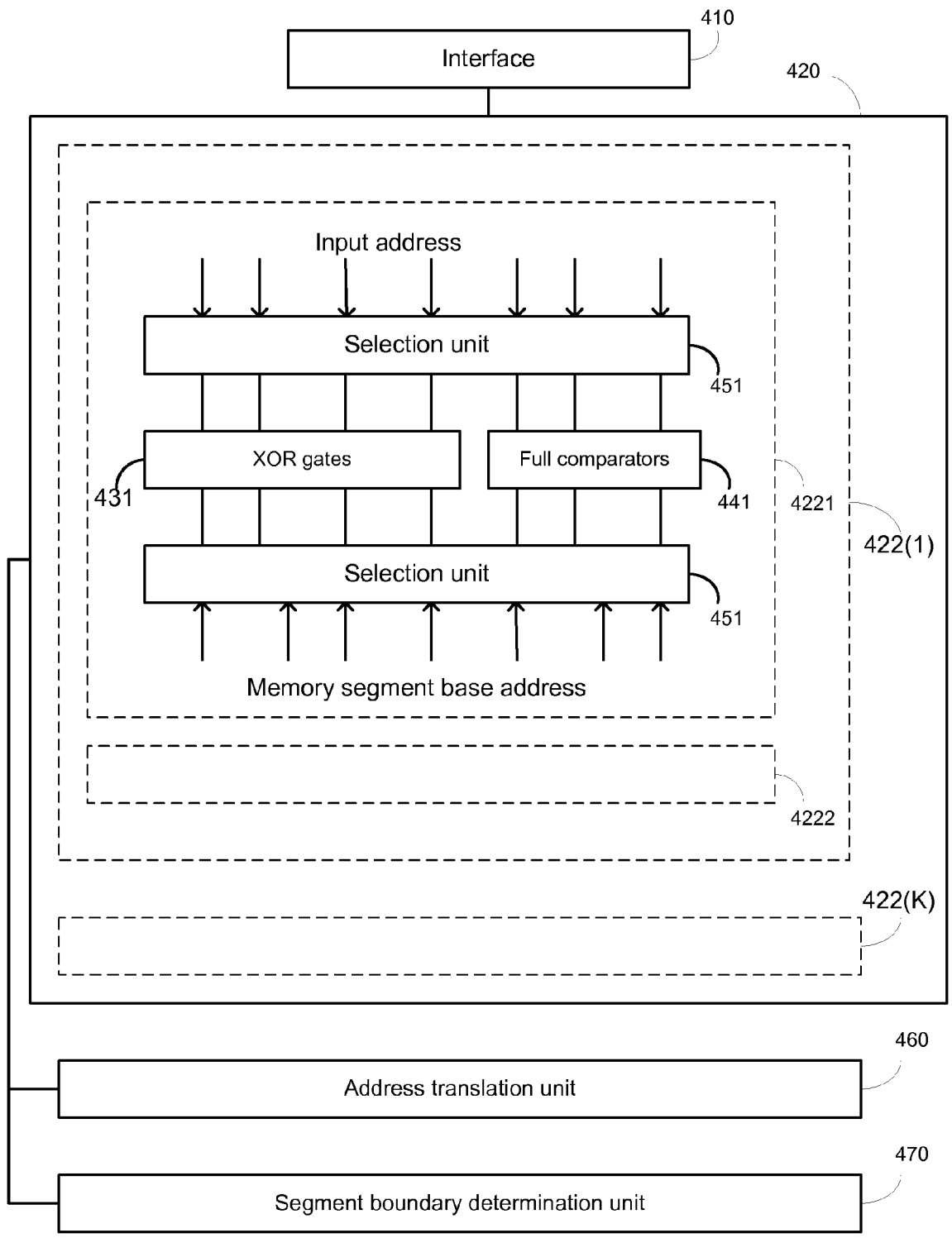
FIG. 4 schematically shows an example of an embodiment of a system.

FIG. 4 schematically shows an example of an embodiment of system 400.

System 400 has address comparison capabilities. It includes interface 410 for receiving an input address and address comparison unit 420.

Address comparison unit 420 is configured to determine whether the input address is within a memory segment out of a group of memory segments by comparing, in parallel, the input address to memory segment boundaries of each memory segment of the group. The parallel comparisons can be implemented by multiple comparison modules 422(1)-422(K). Each comparison module includes a pair of comparison circuits. For example, comparison module 422(1) includes first comparison circuit 4221 that compares the input address to a memory segment start address and second comparison circuit 4222 that compares the input address to a memory segment end address.

First comparison circuit 4221 includes multiple XOR gates that are collectively denoted 431, a set of full comparators that is collectively denoted 441 and selection circuit 451. Selection circuit 451 is configured to: (i) provide bits of a most significant portion of the input address and corresponding bits of a most significant portion of the memory segment start address to the multiple XOR gates 431; (ii) provide bits of an intermediate portion of the input address (from interface 410) and corresponding bits of an intermediate portion of the memory segment start address to the set of full comparators 441. Selection circuit 451 can include a controller or state machine as well as multiple multiplexers or other switching circuits that are capable of providing the appropriate bits to XOR gates 431 and to the set of full comparators 441.

XOR gates 431 can belong only to a single comparison circuit out of first and second comparison circuits 4221 and 4222. Thus, XOR operations are applied between a most significant portion of input address and only one memory segment boundary. This can save semiconductor space, especially when the most significant portion of a memory segment start address equals to the most significant portion of the memory segment end address.

Multiple XOR gates 431 are configured to apply a XOR operation on the bits of the most significant portion of the input address and corresponding bits of the most significant portion of the memory segment start address.

Set of full comparators 441 is configured to compare between the bits of the intermediate portion of the input address and the corresponding bits of the intermediate portion of the memory segment start address.

Address comparison unit 420 ignores bits of a least significant portion of the input address and corresponding bits of a least significant portion of the memory segment start address.

The selection made by selection circuit 451 is responsive to selection information that determined a location of bits that form the intermediate portion of the input address and of the memory segment start address. The selection information is determined in response to an alignment restriction imposed on the memory segment, to a size of the memory segment and in response to a boundary restriction imposed on the memory segment.

System 400 can also include address translation unit 460 that is configured to perform an address translation of the input address, if the input address is within a memory segment out of a group of memory segments. The address translation unit can translate the input address to an output address. The translation can be a virtual to physical address translation but this is not necessarily so.

If address translation unit 460 performs an address translation from an input memory segment (for example—a virtual memory segment) to an output memory segment (for example—a physical memory segment) then the address translation can include: (i) replacing bits of the most significant portion of the input address by corresponding bits of a most significant portion of an output memory segment base address; (ii) copying the bits of the least significant portion of the input address; and (iii) adding to the intermediate portion of the input address a difference between an output memory segment base address and an input memory segment base address.

System 400 can also include segment boundary determination unit 470 that is configured to select a segment boundary to provide a highest boundary restriction in view of the size of the memory segment and in view of the alignment restriction. Higher boundary restrictions impose fewer limitations on the allocation of memory segments. For example, it is easier to select a memory segment that should not include an integer multiple of 16 Mega Bytes than selecting a memory segment that should not include an integer multiple of 64 Kilo Bytes.

Segment boundary determination unit 470 can be configured to: (i) receive an input memory segment boundary, an output memory segment boundary and a size of the input memory segment; (ii) determine an alignment restriction in response to the input memory segment boundary and the output memory segment boundary; and (iii) determine the location of bits that form the intermediate portion of the input address and of the memory segment boundary in response to the alignment restriction. The input memory segment boundary, output memory segment boundary and size of the input memory segment can be received from a user interface, from a processor, and the like.

Segment boundary determination unit 470 can apply method 100.

System 400 can include a multiple core integrated circuit and especially a multiple core Digital Signal Processing integrated circuit. It can include a Memory Management Unit (MMU) that performs memory address comparisons and address translations. Such an MMU can be connected to one or more cores and to one or more memory modules such as a cache memory module, a high level memory module, and the like.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations, and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps from those listed in a claim. Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A method for address comparison, the method comprising:
   receiving an input address;
   determining whether the input address is within a memory segment out of a group of memory segments by comparing, in parallel, the input address to memory segment boundaries of each memory segment of the group;
   wherein a comparison between the input address and a memory segment boundary comprises:
      applying, by a comparison circuit, a XOR operation on bits of a most significant portion of the input address and corresponding bits of a most significant portion of the memory segment boundary;
      ignoring bits of a least significant portion of the input address and corresponding bits of a least significant portion of the memory segment boundary; and
      comparing, by utilizing a set of full comparators, between bits of an intermediate portion of the input address and corresponding bits of an intermediate portion of the memory segment boundary;
   wherein a location of bits that form the intermediate portion of the input address and of the memory segment boundary is selected in response to an alignment restriction imposed on the memory segment, to a size of the memory segment and in response to a boundary restriction imposed on the memory segment.

2. The method according to claim 1 wherein the receiving is preceded by selecting a segment boundary to provide a highest boundary restriction in view of the size of the memory segment and in view of the alignment restriction.

3. The method according to claim 1 wherein the receiving of the input address is preceded by:
   receiving an input memory segment boundary, an output memory segment boundary and a size of a input memory segment;
   determining the alignment restriction in response to the input memory segment boundary and the output memory segment boundary; and
   determining the location of bits that form the intermediate portion of the input address and of the memory segment boundary in response to the alignment restriction.

4. The method according to claim 1 comprising performing an address translation of the input address, if the input address is within the memory segment out of the group of memory segments.

5. The method according to claim 4 wherein the input address is an input address that belongs to an input memory segment out of the group of memory segments; wherein the performing of the address translation comprises:
   replacing bits of the most significant portion of the input address by corresponding bits of a most significant portion of an output memory segment base address;
   copying the bits of the least significant portion of the input address; and
   adding to the intermediate portion of the input address a difference between the output memory segment base address and an input memory segment base address.

6. The method according to claim 1 comprising determining whether the input address is within the memory segment out of the group of memory segments by comparing, in parallel, the input address to memory segment information of each memory segment of the group;
   wherein at least two memory segments have different sizes.

7. The method according to claim 1 wherein the intermediate portion of the input address is less than one half of the input address.

8. The method according to claim 1 wherein the intermediate portion of the input address is less than one third of the input address.

9. The method according to claim 1 wherein the intermediate portion of the input address is smaller than the most significant portion of the input address.

10. The method according to claim 1 comprising selecting which bits of the input address to send to XOR logical gates, selecting which bits of the input address to send to the set of comparators and which bits of the input address to ignore.

11. A system having address comparison capabilities, the system comprising:
an interface for receiving an input address;
an address comparison unit, configured to determine whether the input address is within a memory segment out of a group of memory segments by comparing, in parallel, the input address to memory segment information of each memory segment of the group;
wherein the address comparison unit comprises multiple comparison modules; each comparison module comprises a pair of comparison circuits; whereas a first comparison circuit compares the input address to a memory segment boundary and a second comparison circuit compares the input address to a memory segment end address;
wherein the first comparison circuit comprises multiple XOR gates, a set of full comparators, and a selection circuit;
wherein the selection circuit is configured to:
provide bits of a most significant portion of the input address and corresponding bits of a most significant portion of the memory segment boundary to the multiple XOR gates;
provide bits of an intermediate portion of the input address and corresponding bits of an intermediate portion of the memory segment boundary to the set of comparators;
wherein the multiple XOR gates are configured to apply a XOR operation on the bits of the most significant portion of the input address and corresponding bits of the most significant portion of the memory segment boundary;
wherein the set of full comparators are configured to compare between the bits of the intermediate portion of the input address and the corresponding bits of the intermediate portion of the memory segment boundary;
wherein the address comparison unit ignores bits of a least significant portion of the input address and corresponding bits of a least significant portion of the memory segment boundary; and
wherein the selection circuit is responsive to selection information that determined a location of bits that form the intermediate portion of the input address and of the memory segment boundary; wherein the selection information is determined in response to an alignment restriction imposed on the memory segment, to a size of the memory segment and in response to a boundary restriction imposed on the memory segment.

12. The system according to claim 11 comprising a segment boundary determination unit that is configured to select a segment boundary to provide a highest boundary restriction in view of the size of the memory segment and in view of the alignment restriction.

13. The system according to claim 11 comprising a segment boundary determination unit that is configured to: receive an input memory segment boundary, an output memory segment boundary and a size of an input memory segment; determine the alignment restriction in response to the input memory segment boundary and the output memory segment boundary; and determine the location of bits that form the intermediate portion of the input address and of the memory segment boundary in response to the alignment restriction.

14. The system according to claim 11 comprising an address translation unit that is configured to perform an address translation of the input address, if the input address is within the memory segment out of the group of memory segments.

15. The system according to claim 14 wherein the input address is an input address that belongs to an input memory segment out of a group of memory segments; wherein the address translation unit performs an input to output address translation that comprises:
replacing bits of the most significant portion of the input address by corresponding bits of a most significant portion of an output memory segment base address;
copying the bits of the least significant portion of the input address; and
adding to the intermediate portion of the input address a difference between the output memory segment base address and an input memory segment base address.

16. The system according to claim 11 comprising at least two address comparison modules are associated with memory segments of different sizes.

17. The system according to claim 11 wherein the intermediate portion of the input address is less than one half of the input address.

18. The system according to claim 11 wherein the intermediate portion of the input address is less than one third of the input address.

19. The system according to claim 11 wherein the intermediate portion of the input address is smaller than the most significant portion of the input address.

* * * * *